(12) United States Patent
O'Sullivan

(10) Patent No.: US 7,697,545 B1
(45) Date of Patent: Apr. 13, 2010

(54) DISCOVERY OF COMPONENT RELATIONSHIPS IN DISTRIBUTED DATA PROCESSING NETWORKS

(75) Inventor: Patrick O'Sullivan, Duck Key, FL (US)

(73) Assignee: Computer Associates Think, Inc., Islandia, NY (US)

( * ) Notice: Subject to any disclaimer, the term of this patent is extended or adjusted under 35 U.S.C. 154(b) by 904 days.

(21) Appl. No.: 11/182,654

(22) Filed: Jul. 14, 2005

Related U.S. Application Data

(60) Provisional application No. 60/588,257, filed on Jul. 14, 2004.

(51) Int. Cl.
*H04L 12/28* (2006.01)
*H04L 12/56* (2006.01)

(52) U.S. Cl. .................. 370/395.52; 370/256; 370/258

(58) Field of Classification Search ................ 370/254, 370/255, 256, 257, 258, 395.52
See application file for complete search history.

(56) References Cited

U.S. PATENT DOCUMENTS

| | | | | | |
|---|---|---|---|---|---|
| 5,309,437 | A * | 5/1994 | Perlman et al. | ............. | 370/401 |
| 5,651,006 | A * | 7/1997 | Fujino et al. | ................ | 370/408 |
| 5,796,736 | A * | 8/1998 | Suzuki | ........................ | 370/254 |
| 5,944,794 | A * | 8/1999 | Okamoto et al. | ............ | 709/225 |
| 5,966,513 | A * | 10/1999 | Horikawa et al. | ........... | 709/223 |
| 6,101,543 | A * | 8/2000 | Alden et al. | ................ | 709/229 |
| 6,158,008 | A * | 12/2000 | Maria et al. | .................... | 726/13 |
| 6,219,703 | B1 * | 4/2001 | Nguyen et al. | ............. | 709/224 |
| 6,363,072 | B1 * | 3/2002 | Furuichi | ................. | 370/395.52 |
| 6,538,990 | B1 * | 3/2003 | Prorock | ...................... | 370/229 |
| 6,564,337 | B1 * | 5/2003 | Yoneda et al. | ................. | 714/4 |
| 6,628,649 | B1 * | 9/2003 | Raj et al. | ..................... | 370/360 |
| 6,931,018 | B1 * | 8/2005 | Fisher | ......................... | 370/401 |
| 7,080,135 | B1 * | 7/2006 | Williams | .................... | 709/223 |
| 7,180,887 | B1 * | 2/2007 | Schwaderer et al. | ........ | 370/351 |
| 7,233,991 | B2 * | 6/2007 | Adhikari | ..................... | 709/224 |
| 7,234,163 | B1 * | 6/2007 | Rayes et al. | .................. | 726/22 |
| 7,490,162 | B1 * | 2/2009 | Masters | ...................... | 709/238 |
| 2001/0037387 | A1 * | 11/2001 | Gilde et al. | ................. | 709/225 |
| 2001/0052006 | A1 * | 12/2001 | Barker et al. | ................ | 709/223 |
| 2002/0032761 | A1 * | 3/2002 | Aoyagi et al. | ............... | 709/223 |
| 2002/0035642 | A1 * | 3/2002 | Clarke et al. | ................ | 709/244 |
| 2002/0112076 | A1 * | 8/2002 | Rueda et al. | ................ | 709/245 |
| 2002/0176427 | A1 * | 11/2002 | Noda et al. | ................. | 370/401 |
| 2002/0196782 | A1 * | 12/2002 | Furukawa et al. | ........... | 370/352 |
| 2003/0002484 | A1 * | 1/2003 | Freedman | .................... | 370/352 |
| 2003/0043853 | A1 * | 3/2003 | Doyle et al. | ................. | 370/489 |

(Continued)

*Primary Examiner*—Daniel J Ryman
*Assistant Examiner*—Andrew Oh
(74) *Attorney, Agent, or Firm*—Vierra Magen Marcus & DeNiro LLP

(57) ABSTRACT

A technique for automated discovery of relationships between components providing a service and discovery of the relationship of shared components to other services. A discovery engine determines a management address for a component experiencing a problem and retrieves a TCP connection table for the component. It then identifies TCP connections that are either active or that were recently active. For each, the destination address is added to a global connection table. After the TCP connection table has been processed in this manner, the global connection table is traversed and TCP connection tables for each listed destination address are examined recursively. At the conclusion of this recursive process, the management table contains a list of management agents in the distributed system to which the original component had a TCP connection, either directly or indirectly.

16 Claims, 3 Drawing Sheets

U.S. PATENT DOCUMENTS

| | | | |
|---|---|---|---|
| 2003/0088788 A1* | 5/2003 | Yang | 713/201 |
| 2003/0099197 A1* | 5/2003 | Yokota et al. | 370/230 |
| 2003/0115354 A1* | 6/2003 | Schmidt et al. | 709/232 |
| 2004/0152439 A1* | 8/2004 | Kimura et al. | 455/403 |
| 2005/0007962 A1* | 1/2005 | Nam et al. | 370/252 |
| 2005/0010668 A1* | 1/2005 | Chen | 709/227 |
| 2005/0105508 A1* | 5/2005 | Saha | 370/352 |
| 2005/0157730 A1* | 7/2005 | Grant et al. | 370/401 |
| 2005/0271047 A1* | 12/2005 | Huonder et al. | 370/389 |
| 2006/0155981 A1* | 7/2006 | Mizutani et al. | 713/150 |
| 2006/0168263 A1* | 7/2006 | Blackmore | 709/230 |

* cited by examiner

DISCOVERY OF COMPONENT RELATIONSHIPS IN DISTRIBUTED DATA PROCESSING NETWORKS

CROSS-REFERENCE TO RELATED APPLICATIONS

This application claims the benefit of U.S. Provisional Application Ser. No. 60/588,257, filed Jul. 14, 2004, which is incorporated by reference herein in its entirety.

BACKGROUND OF THE INVENTION

1. Field of the Invention

The present invention relates generally to data processing systems, and more particularly, to the automatic discovery of relationships between components of distributed networks, systems, and applications.

2. Description of Background Art

A wide variety of computer-implemented services are available to consumers, manufacturers and others. For example, an investor can buy and sell stocks or other financial instruments over the web; travelers can check in for flights at airport kiosks; products can be configured for shipment; and the like.

Often, a user of a computer-implemented service or a computer program itself wishes to perform a task and cannot, because a necessary component is unavailable. For example, the needed component might be already in use and locked, corrupted, or missing altogether. Alternatively, necessary components might be available, but the overall performance of the service is poor. For example, a stock purchasing service might be functional but slow, so that trades guaranteed by the service provider to process in 5 seconds fail to be processed within 5 seconds, thereby violating an agreement between the stock trading service provider and their customer.

When service-affecting problems occur, software engineers typically seek to resolve them quickly, and where possible to detect them before they affect users of the service. One conventional method for resolving such problems involves proactively testing the end-to-end availability and performance of the IT system delivering the service. A robot can be used to programmatically test the service while monitoring service performance and availability. For example, products such as Keynote Transaction Perspective by Keynote Systems, Inc., Gomez Performance Network, by Gomez, Inc., and Mercury Business Process Monitor, by Mercury Interactive Corporation test services to determine when service failures and degradation occur.

Another method for resolving such problems involves monitoring use of the service to detect service-affecting problems. Solutions such as Timestock CTQ monitor actual users of the service and detect when service-affecting problems exist for these users. Both of these approaches, testing a service, and monitoring a service, along with other approaches, provide awareness of service-affecting performance and availability problems, among other service-affecting problems.

When a performance, availability, or other service-affecting problem is detected, an alert can be sent to an operator. An operator may then manually interrogate the individual components of the service to ascertain where a fault exists. Because services may be composed of a large number of components it may be difficult for the operator to identify those components upon which the service depends.

Services may depend on the performance and availability of many components, such as network routers and switches and the software executing on them; server hardware and the software executing on them, such as web server software, application server software, and database software; and mainframe computers and software executing on them, among other components. To determine dependencies between service components, conventional methods include application of periodic discovery and mapping techniques. These techniques create a map of dependency relationships periodically, generally on a scheduled basis. Micromuse Netcool for Business Service Management, by Micromuse Inc., and Mercury Application Mapping, by Mercury Interactive Corporation, are examples of products that attempt to map these service dependencies.

With the advent of technology such as web services, where relationships between components tend to be ephemeral, mappings can quickly become inaccurate, making it even harder to determine where the cause of a service-affecting problem lies. In addition, services often depend upon components that are shared amongst multiple services. External effects from other services sharing a component may have an effect on the service being tested, monitored, and/or mapped. For example, a service depending upon a certain amount of available bandwidth on a network circuit may be adversely (and temporarily) affected by another service sharing the use of that network circuit. Such interdependencies may not be reflected in a service dependency map, and may be temporary and fleeting.

While this approach may eventually resolve the problem, it is manual, time-consuming, and in many cases relies on prior knowledge that has become inaccurate due to frequent changes in the IT infrastructure environment.

Accordingly, there is a need for a system and method for automatically discovering relationships between components involved in providing a service and for discovering the relationship of shared components to other services at or near the time of a service-affecting problem.

SUMMARY OF THE INVENTION

The present invention enables the automatic discovery of relationships between components involved in providing a service and also enables the discovery of the relationship of shared components to other services at or near the time of a service-affecting problem.

A system in accordance with the present invention includes a discovery engine; an IP-address-to-management-address table; a management agent table; TCP connection tables and a global connection table.

The discovery engine obtains the IP address of a component associated with the identified problem, and using the IP-address-to-management-address table determines a management address for the component. The discovery engine then retrieves a TCP connection table for the component and from the TCP connection table identifies TCP connections that are either active or that were recently active. For each identified connection, the destination address associated with the connection is added to the global connection table. After the TCP connection table has been processed in this manner, the global connection table is traversed. For each row in the global connection table, the management address associated with the indicated destination address is compared to the addresses in the management agent table. If the address is not found in the management table, it is added, and the TCP connection table for the associated component is retrieved and processed as described above. At the conclusion of this recursive process, the management table contains a list of management agents in the distributed system to which the original component had a TCP connection, either directly or indirectly. One use of this list of management agents is to access component identity, configuration, utilization, performance, and state information, among other information, for the service components associated with these management agents using access methods well known to those skilled in the art.

DETAILED DESCRIPTION OF THE PREFERRED EMBODIMENTS

Figure 1:
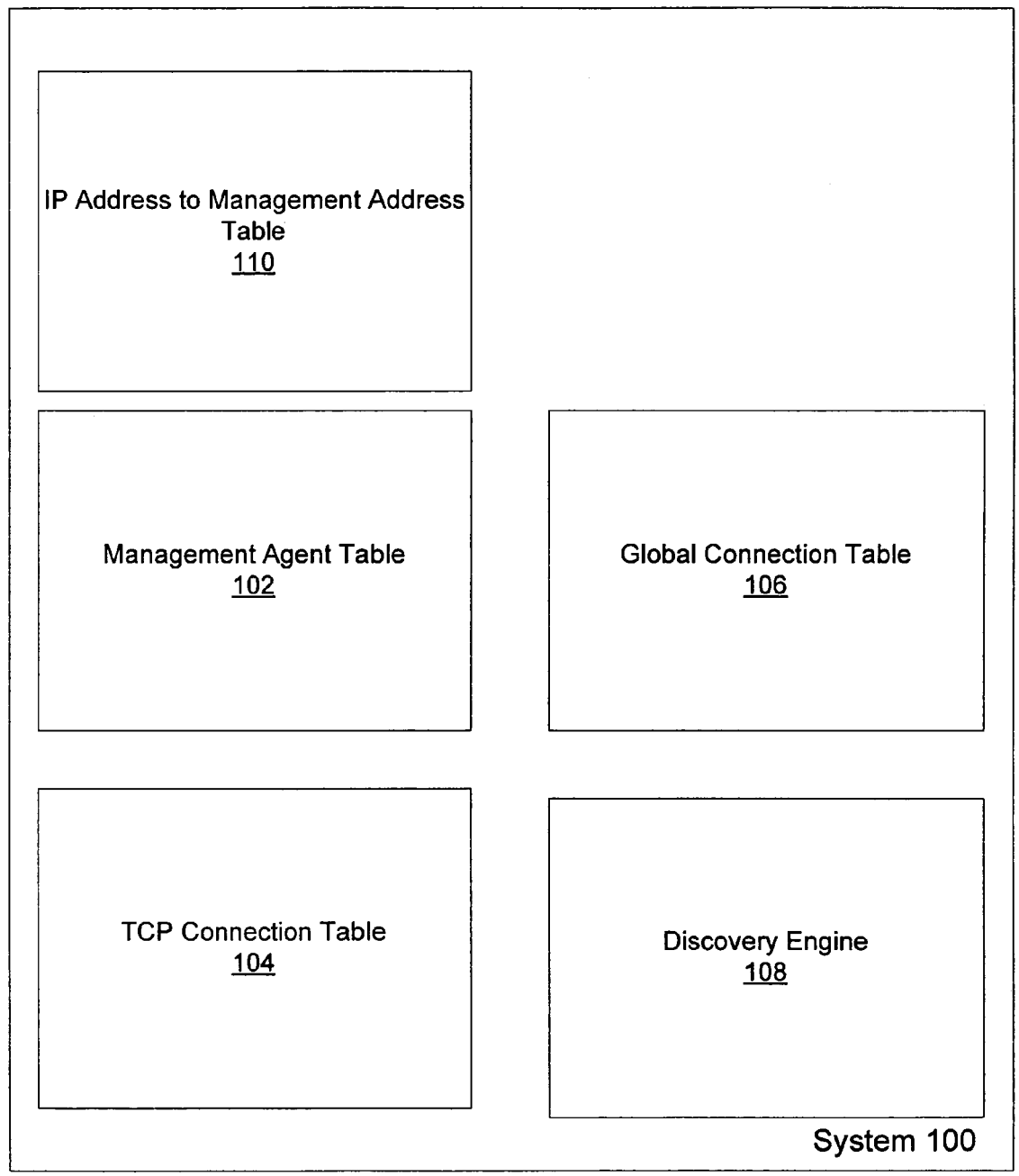
FIG. 1 is a block diagram of the overall architecture of an embodiment of the present invention.

FIG. 1 is a block diagram illustrating a system for discovering component relationships in accordance with an embodiment of the present invention. System 100 includes a management address table 102, a TCP connection table 104, a global connection table 106, a discovery engine 108, and an IP-address-to-management-address table 110. Each is described further below.

Figure 2A:
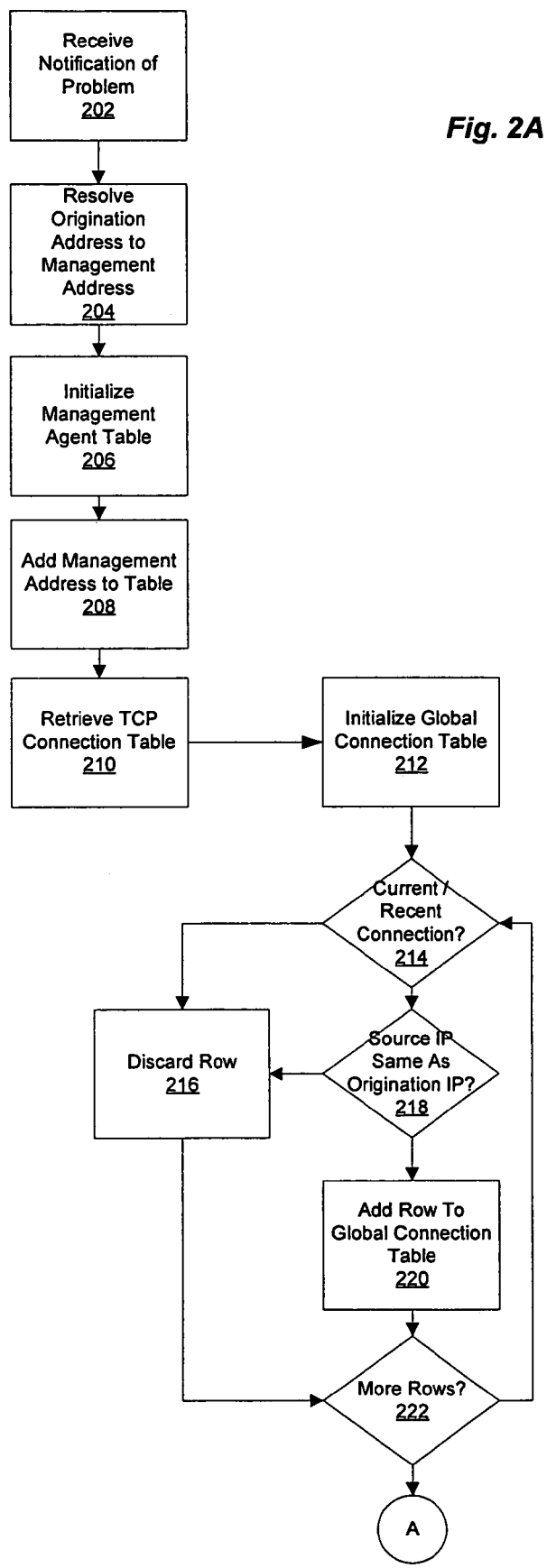
FIG. 2A and FIG. 2B provide a flowchart illustrating a method of automatic discovery of relationships in accordance with an embodiment of the present invention.

Referring to FIG. 2A, system 100 receives 202 a notification that a problem exists with a service. As described above, a problem includes the unavailability of a required component, a performance problem with the service being provided, or more generally a failure of the service to meet a specified metric or other standard of service utility and/or quality. In one embodiment, the existence of a problem can be detected automatically as described for example in U.S. Patent Publication 2003-0191989 A1, incorporated by reference herein in its entirety. In an alternative embodiment, the existence of a problem can be discovered through testing as described above, or through other conventional means.

The notification of a problem preferably includes the IP address of a machine associated with the problem. This IP address is known as the origination address. Discovery engine 108 resolves 204 the origination address to an IP management address by consulting IP-address-to-management-address table 110. For example, the origination address may be the address of a web server responding to a client request and may be resolved through lookup in table 110. IP-address-to-management-address table 110 may be preconfigured with IP address-to-management-address mappings specified by user configuration or populated using automated discovery methods. Discovery engine 108 then initializes 206 management agent table 102, and adds 208 the management address to the table 102.

Once discovery engine 108 obtains the management address of the originating system, it retrieves 210 the TCP connection table 104 from the origination system via the specified management interface. The TCP connection table in one embodiment is in a format as described in IETF RFC 1213, for example, and may be retrieved by access methods in accordance with the SNMP standard, among other access methods. Additional agent access parameters necessary to access this information may be provided by default, for example by trying the default SNMP community string values of "public" and/or "private", or by using pre-defined values specified by user configuration or automated discovery.

Next, discovery engine 108 initializes 212 global connection table 106 for use as described below, and begins to traverse the TCP connection table 104. Rows in the TCP connection table 104 preferably conform to IETF RFC 1213, though other configurations may be used in alternative embodiments. If the connection state is 214 not one indicating that a connection is open or was recently open, for example ESTABLISHED, FIN_WAIT_1, FIN_WAIT_2, CLOSE_WAIT, CLOSING, LAST_ACK, or TIME-WAIT, then the row is discarded 216. Otherwise, the TCP connection source IP address is compared to the origination IP address and if 218 they are the same then the row is discarded 216. If a row is not discarded for either reason, it is added 220 to global connection table 106. If 222 more rows remain in the TCP connection table 104, the process is repeated until the rows in the table are exhausted. At such time, management agent table 102 includes the management IP address of the origination system, and global connection table 106 includes a list of the connections for the origination system that are currently established or that have been recently established for all interfaces except for the interface specified as the origination interface.

Figure 2B:
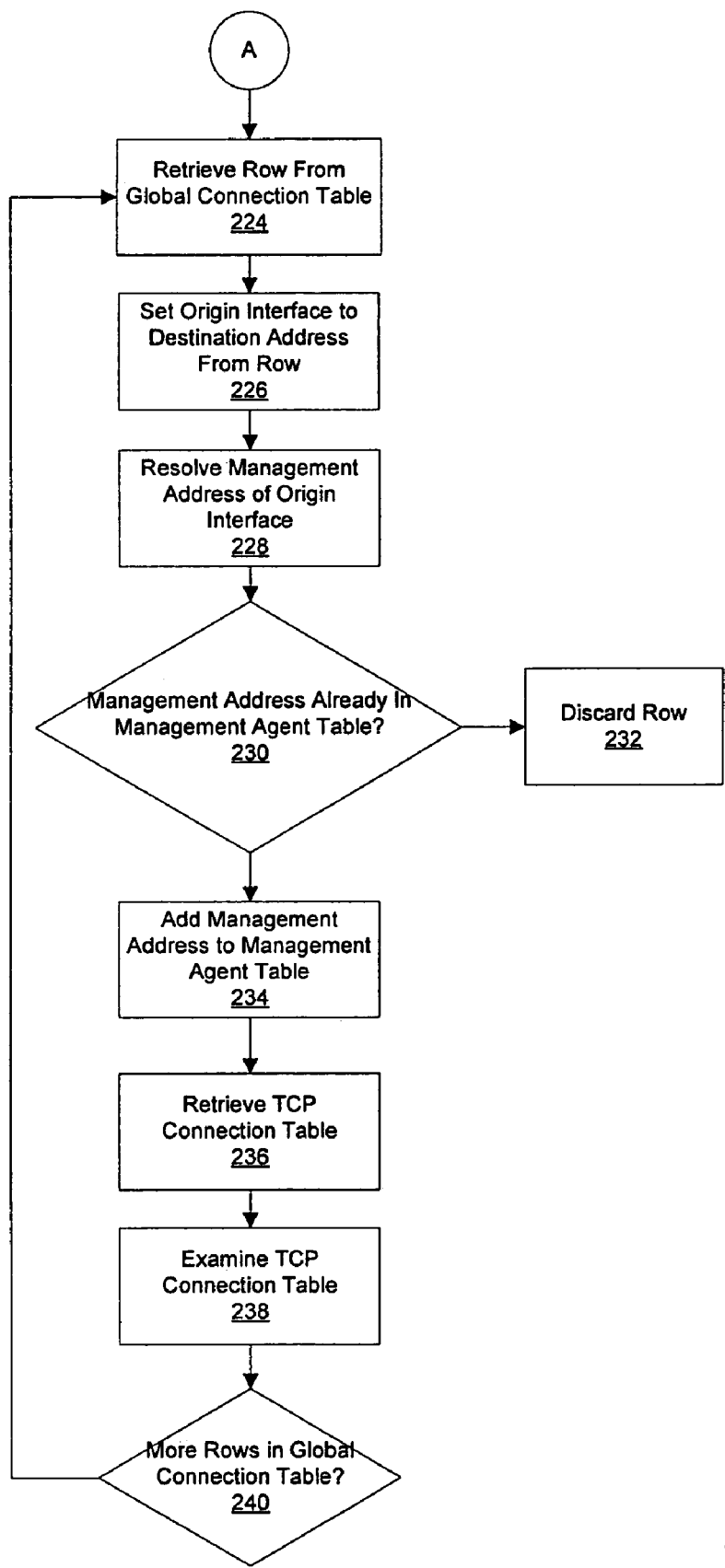

Next, and referring now to FIG. 2B, discovery engine 108 begins to process the rows of global connection table 106. Although the table 106 is preferably traversed only once, rows may be appended to the table 106 as part of the discovery process as described below.

Discovery engine 108 begins by retrieving 224 a first row from global connection table 106 and setting 226 the origination interface to the destination address noted in the retrieved row. Next, discovery engine 108 resolves 228 the management address for this origination address, preferably by looking it up in IP-address-to-management-address table 110. In one embodiment, if the management address cannot be resolved this occurrence is noted and the row discarded. Next, the resolved management address is compared against entries in management table 102. If 230 the address is found in the management table the row is preferably discarded 232. If the management address is not found in the management table 102, the management address is added 234 to the management table 102. Discovery engine 108 then retrieves 236 the TCP connection table 104 for this management address and examines 238 the TCP connection table as described above with respects to steps 214-222. Upon completion of this processing, the global connection table 106 is examined, and if 240 all rows have been processed the method is complete, otherwise the process loops until all rows have been processed.

Upon completion of this process the management table 102 contains a list of the management agents on the computer systems for which the origination server had a TCP connection, either directly or indirectly.

The present invention has been described in particular detail with respect to a limited number of embodiments. Those of skill in the art will appreciate that the invention may additionally be practiced in other embodiments. For example, the functionality of the discovery engine 108 can be provided in other embodiments by other modules.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of discovery engine 108, global connection table 106 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore; it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for automatically discovering component relationships in a network, the method comprising:
   receiving, at a computer system, an origination IP address of an original component;
   determining, at the computer system, an original management address associated with the origination IP address of the original component;
   storing, at the computer system, the original management address;
   retrieving, at the computer system, a TCP connection table associated with the original component, the TCP connection table includes entries, each entry identifies: (a) a TCP connection between the original component and another component, and (b) a source IP address;
   for each entry of at least selected entries of the TCP connection table, at the computer system:
      comparing the source IP address to the origination IP address;
      if the source IP address and the origination IP address are the same, discarding the entry; and
      if the source IP address and the origination IP address are not the same, storing the entry in a global connection table; and
   for each entry in the global connection table, at the computer system:
      determining an associated management address;
      comparing the associated management address to the original management address;
      if the associated management address and the original management address are the same, discarding the entry of the global connection table; and
      if the associated management address and the original management address are not the same, storing the entry of the global connection table.

2. The computer-implemented method of claim 1, wherein the storing the entry of the global connection table comprises storing the entry of the global connection table in a management agent table as a newly added entry, the method further comprising:
   for at least one newly added entry of the management agent table, retrieving a new TCP connection table, the new TCP connection table include entries, each of which identifies: (a) a TCP connection between a new original component and a new another component, the new original component has a new origination IP address and (b) a new source IP address;
   for each entry of at least selected entries of the new TCP connection table:
      comparing the new source IP address to the new origination IP address;
      if the new source IP address and the new origination IP address are the same, discarding the entry of the new TCP connection; and
      if the new source IP address and the new origination IP address are not the same, storing the entry of the new TCP connection in the global connection table as a newly added entry; and
   for each newly added entry in the global connection table:
      determining an associated management address;
      comparing the associated management address of the newly added entry to the original management address;

if the associated management address of the newly added entry and the original management address are the same, discarding the newly added entry of the global connection table; and if the associated management address of the newly added entry and the original management address are not the same, storing the newly added entry of the global connection table.

3. The computer-implemented method of claim 1, wherein:
the storing the original management address comprises storing the original management address in a management agent table; and
the storing the entry of the global connection table comprises storing the entry of the global connection table in the management agent table, the management agent table identifies management agents to which the original component had a TCP connection, directly and indirectly.

4. The computer-implemented method of claim 1, wherein:
each entry of the at least selected entries of the TCP connection table is selected by determining that a connection between the original component and the another component is open.

5. The computer-implemented method of claim 1, wherein:
each entry of the at least selected entries of the TCP connection table is selected by determining that a TCP connection between the original component and the another component was open.

6. The computer-implemented method of claim 1, wherein:
each entry of the at least selected entries of the TCP connection table is selected by determining that a TCP connection between the original component and the another component is active.

7. The computer-implemented method of claim 6, wherein:
for each entry of the at least selected entries of the TCP connection table, the determining that the TCP connection is active comprises determining that a connection state of the TCP connection is at least one of: ESTABLISHED, FIN_WAIT_1, FIN_WAIT_2, CLOSE_WAIT, CLOSING, LAST_ACK, or TIME-WAIT.

8. The computer-implemented method of claim 1, wherein:
the original component is a web server responding to a client request, and the IP address of the original component is received with a notification that a problem exists with the web server; and
said steps of determining the original management address, storing the original management address, and retrieving the TCP connection table, are performed in response to receipt of the notification of the problem.

9. The computer-implemented method of claim 1, wherein:
the TCP connection table is retrieved by an access method in accordance with a SNMP standard.

10. The computer-implemented method of claim 1, wherein:
the storing the original management address comprises storing the original management address in a management agent table; and
the storing the entry of the global connection table comprises storing the entry of the global connection table in the management agent table, the management agent table provides a list which identifies management agents to which the original component had a connection, directly and indirectly.

11. The computer-implemented method of claim 1, further comprising:
after the retrieving the TCP connection table, and prior to the comparing step for the TCP connection table, discarding entries of the TCP connection table for which a TCP connection is determined to be inactive.

12. A tangible computer readable storage medium having instructions configured to cause a processor to perform a method for automatically discovering component relationships in a network, the method comprising:
receiving an origination address of an original component;
determining an original management address associated with the origination address of the original component;
storing the original management address;
retrieving a connection table associated with the original component, the connection table includes entries, each entry identifies: (a) a connection between the original component and another component, and (b) a source address;
for each entry of at least selected entries of the connection table:
comparing the source address to the origination address;
if the source address and the origination address are the same, discarding the entry; and
if the source address and the origination address are not the same, storing the entry in a global connection table; and
for each entry in the global connection table:
determining an associated management address;
comparing the associated management address to the original management address;
if the associated management address and the original management address are the same, discarding the entry of the global connection table; and
if the associated management address and the original management address are not the same, storing the entry of the global connection table.

13. The tangible computer readable storage medium of claim 12, wherein the method performed further comprises:
after the retrieving the connection table, and prior to the comparing step for the connection table, discarding entries of the connection table for which a connection is determined to be inactive.

14. The tangible computer readable storage medium of claim 12, wherein:
the storing the original management address comprises storing the original management address in a management agent table; and
the storing the entry of the global connection table comprises storing the entry of the global connection table in the management agent table, the management agent table provides a list which identifies management agents to which the original component had a connection, directly and indirectly.

15. The tangible computer readable storage medium of claim 12, wherein:
each entry of the at least selected entries of the connection table is selected by determining that a connection between the original component and the another component is open.

16. The tangible computer readable storage medium of claim 12, wherein:
each entry of the at least selected entries of the connection table is selected by determining that a connection between the original component and the another component was open.

* * * * *